United States Patent
Fujimura et al.

(10) Patent No.: US 12,470,367 B2
(45) Date of Patent: Nov. 11, 2025

(54) IDENTIFIER CHANGE MANAGEMENT APPARATUS, IDENTIFIER CHANGE MANAGEMENT METHOD, AND IDENTIFIER CHANGE MANAGEMENT PROGRAM

(71) Applicant: NTT, Inc., Tokyo (JP)

(72) Inventors: Shigeru Fujimura, Musashino (JP); Shigenori Ohashi, Musashino (JP); Atsushi Nakadaira, Musashino (JP)

(73) Assignee: NTT, Inc., Tokyo (JP)

( * ) Notice: Subject to any disclaimer, the term of this patent is extended or adjusted under 35 U.S.C. 154(b) by 181 days.

(21) Appl. No.: 18/029,303

(22) PCT Filed: Oct. 7, 2020

(86) PCT No.: PCT/JP2020/038038
§ 371 (c)(1),
(2) Date: Mar. 29, 2023

(87) PCT Pub. No.: WO2022/074772
PCT Pub. Date: Apr. 14, 2022

(65) Prior Publication Data
US 2023/0361990 A1  Nov. 9, 2023

(51) Int. Cl.
*H04L 9/08* (2006.01)
*G06F 21/64* (2013.01)
*H04L 9/32* (2006.01)

(52) U.S. Cl.
CPC .......... *H04L 9/0825* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 11,250,507 B2 * | 2/2022 | Xu | G06Q 20/3827 |
| 2018/0316507 A1 * | 11/2018 | Smith | H04L 9/3271 |
| 2019/0238344 A1 * | 8/2019 | Kaga | H04L 9/3239 |

FOREIGN PATENT DOCUMENTS

| | | | | |
|---|---|---|---|---|
| JP | 2018055203 A | * | 4/2018 | ......... G06Q 20/3829 |
| JP | 6628188 B2 | | 1/2020 | |
| WO | WO-2020006425 A1 | | 1/2020 | |

OTHER PUBLICATIONS

Pedrosa, Micael et al., RAIAP: renewable authentication on isolated anonymous profiles, Aug. 2, 2019.

* cited by examiner

*Primary Examiner* — Christopher B Robinson
(74) *Attorney, Agent, or Firm* — Harness, Dickey & Pierce, P.L.C.

(57) ABSTRACT

An identifier change management apparatus according to an embodiment includes: a distributed ledger in which an identifier change program holding a public key used in an identifier change is registered; a distributed ledger management unit that manages the distributed ledger; an identifier change key input unit that receives a secret key used in the identifier change; a transaction issuing unit that issues an identifier change transaction including a signature value of an electronic signature that has been performed using the secret key; and a program control management unit that changes the identifier when the distributed ledger management unit receives the identifier change transaction, by the identifier change program, on condition that the signature value included in the identifier change transaction is verifiable by using the public key.

7 Claims, 5 Drawing Sheets

Fig. 4

- ID OF IDENTIFIER MANAGEMENT PROGRAM
- FUNCTION INFORMATION FOR SPECIFYING FUNCTION TO BE EXECUTED IN IDENTIFIER MANAGEMENT PROGRAM
- PUBLIC KEY $P_{n+1}$ IN NEXT IDENTIFIER CHANGE $\left.\right\}m$

- SIGNATURE VALUE $\sigma_n$ OF SIGNATURE THAT HAS BEEN PERFORMED WITH SECRET KEY $s_n$ USED IN IDENTIFIER CHANGE WITH RESPECT TO HASH VALUE $H(m)$

IDENTIFIER CHANGE MANAGEMENT APPARATUS, IDENTIFIER CHANGE MANAGEMENT METHOD, AND IDENTIFIER CHANGE MANAGEMENT PROGRAM

CROSS-REFERENCE TO RELATED APPLICATIONS

This application is a 371 U.S. National Phase of International Application No. PCT/JP2020/038038, filed on Oct. 7, 2020. The entire disclosure of the above application is incorporated herein by reference.

TECHNICAL FIELD

The present invention relates to an identifier change management apparatus, an identifier change management method, and an identifier change management program.

BACKGROUND ART

In transactions of cryptocurrency represented by bitcoin (registered trademark), blockchains are used as a type of decentralized distributed ledger technology. In the distributed ledger technology, each user terminal participating in the network holds the same distributed ledger.

There is a method that requires cooperation of a trusted third party when an identifier (address) on a distributed ledger is changed. As an example of a method of using a trusted third party, a condition for an identifier change is set such that two signatures among three pre-registered signatures are collected, and a user terminal manages two keys for the signature and a trusted third party manages remaining one key. As a result, even when one of the keys managed by the user terminal is leaked or lost, the condition for the identifier change is satisfied by cooperating with the trusted third party, a signature to be newly used is registered, and the condition for the next identifier change can be changed. As a method for achieving such a management form, there is a method called multi-signature (see, for example, Patent Literature 1).

CITATION LIST

Patent Literature

Patent Literature 1: JP 6628188 B2

SUMMARY OF INVENTION

Technical Problem

When a trusted third party betrays or a user terminal leaks or loses two keys due to negligence, the user terminal cannot change an identifier. In addition, the largest feature of the distributed ledger is the distribution of the authority. Therefore, when a trusted third party is set in the system of the distributed ledger system, there is a person having privilege in some functional capabilities, and the largest feature of the distributed ledger is lost.

The present invention has been made in view of the above circumstances, and an object of the present invention is to provide an identifier change management apparatus, an identifier change management method, and an identifier change management program capable of changing an identifier without requiring a trusted third party.

Solution to Problem

In order to achieve the above object, an identifier change management apparatus connectable to a distributed ledger network of the present invention includes: a distributed ledger in which an identifier change program holding a public key used in an identifier change is registered; a distributed ledger management unit that manages the distributed ledger; an identifier change key input unit that receives a secret key used in the identifier change; a transaction issuing unit that issues an identifier change transaction including a signature value of an electronic signature that has been performed using the secret key; and a program control management unit that changes the identifier when the distributed ledger management unit receives the identifier change transaction, by the identifier change program, on condition that the signature value included in the identifier change transaction is verifiable by using the public key.

Advantageous Effects of Invention

According to an aspect of the present invention, it is possible to provide an identifier change management apparatus, an identifier change management method, and an identifier change management program capable of changing an identifier without requiring a trusted third party.

BRIEF DESCRIPTION OF DRAWINGS

FIG. 4 is a diagram illustrating a data structure of an identifier change transaction.

DESCRIPTION OF EMBODIMENTS

Hereinafter, embodiments according to the present invention will be described with reference to the drawings.

[Configuration]

Figure 1:
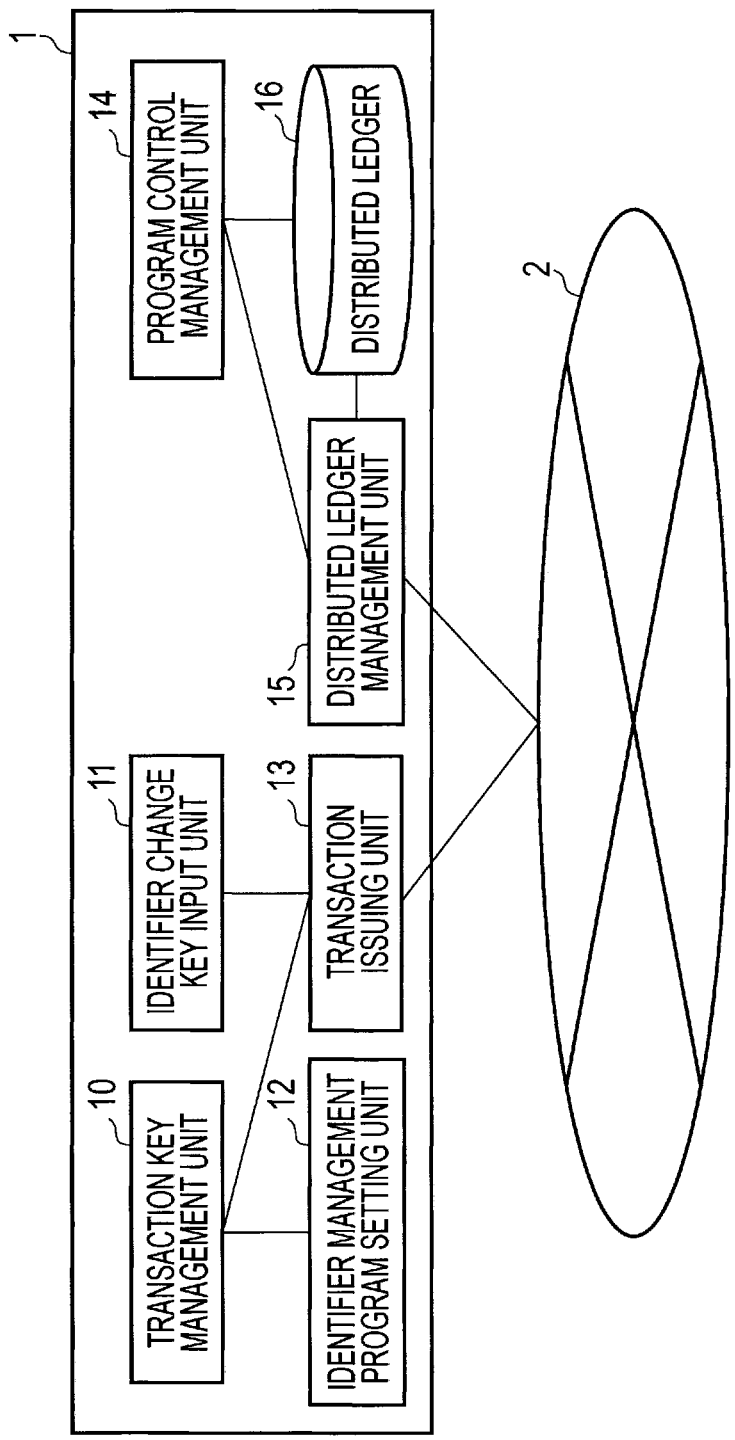
FIG. 1 is a diagram illustrating an overall configuration of a distributed ledger system including a user terminal that operates as an identifier change management apparatus and a distributed ledger network in an embodiment.

FIG. 1 is a diagram illustrating an overall configuration of a distributed ledger system including a user terminal 1 that operates as an identifier change management apparatus and a distributed ledger network 2 in the present embodiment. The distributed ledger system illustrated in FIG. 1 includes the user terminal 1 and the distributed ledger network 2.

The user terminal 1 is connected to the distributed ledger network 2 which is a peer-to-peer (P2P) network in an autonomously distributed manner. In addition to the user terminal 1 illustrated in FIG. 1, a plurality of user terminals are connected to the distributed ledger network 2. For example, a plurality of user terminals 1 may be connected.

The user terminal 1 includes a transaction key management unit 10, an identifier change key input unit 11, an identifier management program setting unit 12, a transaction issuing unit 13, a program control management unit 14, a distributed ledger management unit 15, and a distributed ledger 16. The user terminal 1 is, for example, a node that uses the distributed ledger network 2. The node has a functional capability of performing transaction verification processing and updating and holding ledger information.

The transaction key management unit 10 manages a secret key for transaction issuance. The secret key for issuing the transaction is also a secret key for using various functional capabilities on the distributed ledger 16. Various functional capabilities may be any functional capabilities as long as the functional capabilities are information stored in the distributed ledger 16 and the ownership can be transmitted and received between the user terminals 1. For example, the various functional capabilities may be functions such as transactions of cryptocurrency.

The identifier change key input unit 11 is an input unit that receives an input of a secret key for the identifier change securely held by the user terminal 1 in the identifier change. Here, the identifier is an identifier that forms a pair with the secret key managed by the transaction key management unit 10 and is generated from the public key held in the distributed ledger 16. That is, the identifier change means changing the corresponding secret key and public key. The secret key for the identifier change is managed in a storage place different from the user terminal 1 such as paper or a dedicated device. That is, the secret key for the identifier change may be held by a general method that can be securely held by the user. For example, the secret key for the identifier change is managed as a QR code (registered trademark) printed on paper outside the user terminal 1. The secret key managed externally may be used once or may be prepared a plurality of times.

The identifier management program setting unit 12 sets various conditions in the identifier management program to be registered or registered in the distributed ledger 16. In the identifier management program, a condition for checking that the transaction has been properly issued from the user terminal 1 at the time of normal use is set by the identifier management program setting unit 12. The condition in the present embodiment is successful verification of the electronic signature included in various transactions issued from the user terminal 1. Therefore, the identifier management program holds a public key $P_{n-1}$ paired with a secret key $s_{n-1}$ used during normal use held by the transaction key management unit 10. s represents a secret key, P represents a public key, and n represents any positive integer. The identifier management program calculates an available identifier from the public key $P_{n-1}$. The available identifier corresponds to a so-called address or account used by the user terminal 1. A method of calculating the available identifier is assumed to be a general method of acquiring from the public key, and a detailed description thereof will be omitted here.

In the identifier management program, an identifier change condition is set by the identifier management program setting unit 12. The identifier change condition in the present embodiment is set when a signature value $\sigma_n$ of the electronic signature included in the transaction is verifiable using the public key $P_n$ used in the next identifier change. Here, a represents a signature value. Therefore, the identifier management program holds the public key $P_n$ used in the next identifier change. The identifier management program has a function that provides a functional capability for various conditions when the conditions are satisfied.

The transaction issuing unit 13 issues a transaction to the distributed ledger network 2 by using the secret key managed by the transaction key management unit 10. For example, the transaction issuing unit 13 issues a transaction including a transaction of cryptocurrency or the like. In the present embodiment, the transaction issuing unit 13 also issues a transaction for registering the identifier management program set by the identifier management program setting unit 12 on the distributed ledger 16 and a transaction for changing the identifier on the distributed ledger 16. A transaction for changing the identifier on the distributed ledger 16 will be described later.

The program control management unit 14 controls and manages programs such as an identifier management program stored on the distributed ledger 16. In the present embodiment, the program control management unit 14 rewrites the identifier management program in response to the identifier change request from the user terminal 1. Therefore, the program control management unit 14 controls this rewriting and manages the identifier management program.

The distributed ledger management unit 15 maintains the distributed ledger network 2 in cooperation with other user terminals connected to the distributed ledger network 2 in an autonomously distributed manner. The distributed ledger management unit 15 causes the program control management unit 14 to check whether the issued transaction has been properly issued from the user terminal 1 using the identifier management program stored in the distributed ledger 16. For example, the program control management unit 14 verifies a signature value $\sigma_{n-1}$ of the electronic signature added to the transaction by using a public key $P_{n-1}$. When the signature verification procedure is successful, the program control management unit 14 determines that the transaction has been properly issued from the user terminal 1. The signature verification may be performed by a general method using the public key $P_{n-1}$, and detailed description thereof will be omitted here.

When receiving the transaction issued to the distributed ledger network 2, the distributed ledger management unit 15 causes the program control management unit 14 to execute a program for performing verification/approval procedure of the received transaction. For example, in the case of using a blockchain, the program control management unit 14 generates one block by collecting transactions issued on the distributed ledger network 2 within a predetermined time, and performs mining of the block. The program control management unit 14 adds the block that has been verified successfully to the blockchain stored in the distributed ledger 16. The technology for maintaining the distributed ledger network 2 is not limited to the blockchain, and may be any technology for maintaining the distributed ledger network 2, such as a directed acyclic graph (DAG). As a method of approving the new block, for example, a method other than mining, such as using a distributed consensus algorithm, may be used.

The distributed ledger 16 is synchronized with the distributed ledgers 16 of all the user terminals 1 connected to the distributed ledger network 2 via the distributed ledger management unit 15, thereby storing transactions for which verification has been successful. For example, in a case where a blockchain is used, the distributed ledger 16 stores a blockchain and a data set managed by the blockchain.

The distributed ledger network 2 is a network using a decentralized distributed ledger technology, which requires no specific administrator. The distributed ledger network 2 may be any of an open type, a private type, and a consortium type. However, the distributed ledger network 2 can be managed by the distributed ledger 16, and is assumed to be a network that does not include processing registered posteriori by a specific administrator in the process of transaction verification, execution, and registration in the distributed ledger 16.

Figure 2:
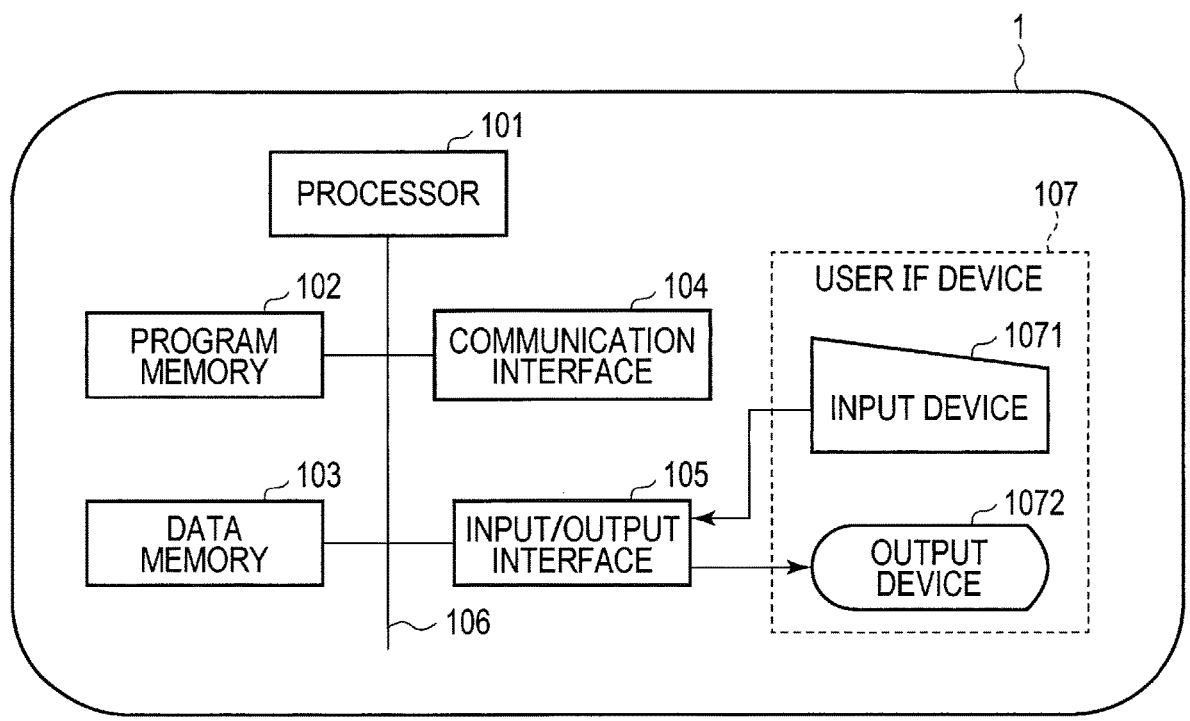
FIG. 2 is a block diagram illustrating an example of a hardware configuration of a user terminal.

FIG. 2 is a block diagram illustrating an example of a hardware configuration of the user terminal 1.

The user terminal 1 includes, for example, a hardware processor 101 such as a central processing unit (CPU) or a micro processing unit (MPU). In addition, a program memory 102, a data memory 103, a communication interface 104, and an input/output interface 105 are connected to the processor 101 via a bus 106.

The program memory 102 can use, as a storage medium, a combination of a nonvolatile memory to and from which writing and reading can be performed at any time, such as an erasable programmable read only memory (EPROM) or a memory card, and a nonvolatile memory such as a read only memory (ROM), for example. The program memory 102 stores a program necessary for the processor 101 to execute various types of control processing according to an embodiment. That is, any processing functional capability unit in each unit of a functional configuration described above can be implemented by the above-described processor 101 reading and executing a program stored in the program memory 102.

The data memory 103 is a storage using, as a storage medium, a combination of a nonvolatile memory to and from which writing and reading can be performed at any time, such as a memory card, and a volatile memory such as a random access memory (RAM), for example. The data memory 103 is used to store data acquired and created in the process in which the processor 101 executes a program to perform various types of processing. That is, in the data memory 103, an area for storing various types of data is appropriately secured in the process of performing the various types of processing. The distributed ledger 16 includes the program memory 102 and the data memory 103. That is, a program such as an identifier management program stored on the distributed ledger 16 is stored in the program memory 102, and data such as a blockchain is stored in the data memory 103.

The communication interface 104 includes one or more wireless communication modules. For example, the communication interface 104 includes a wireless communication module using a short-range wireless technology such as Bluetooth (registered trademark). Furthermore, the communication interface 104 includes, for example, a wireless communication module wirelessly connected to a Wi-Fi access point or a mobile phone base station. The wireless communication module is connected to the distributed ledger network 2 via a Wi-Fi access point or a mobile phone base station under the control of the processor 101, and can communicate with other user terminals to transmit and receive various types of information. Note that the communication interface 104 may include one or more wired communication modules.

The input/output interface 105 is an interface with a user interface device 107. Note that, in FIG. 2, the "user interface device" is described as "USER IF DEVICE".

The user interface device 107 includes an input device 1071 and an output device 1072. The output device 1072 is a display device using, for example, liquid crystal, organic electro luminescence (EL), or the like, and displays an image according to a signal input from the input/output interface 105. The input device 1071 is an input detection sheet that is disposed on a display screen of the display device as the output device 1072 and employs an electrostatic method or a pressure method, and outputs a touch position of the user to the processor 101 via the input/output interface 105. The input device 1071 and the output device 1072 may be configured by independent devices. The input/output interface 105 can input the operation information input in the input device 1071 to the processor 101 and cause the output device 1072 to display the display information generated by the processor 101.

[Operation]

Figure 3:
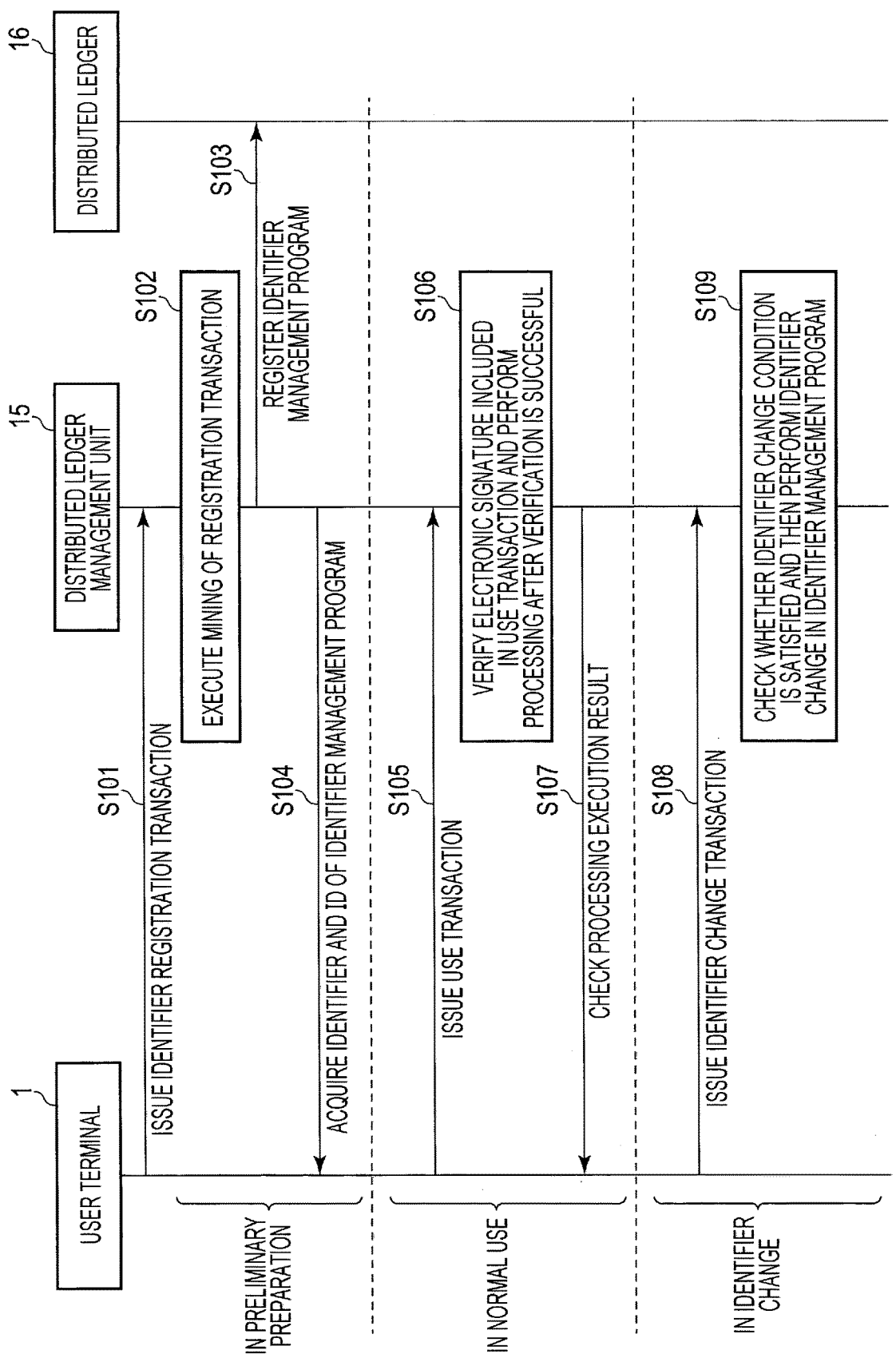
FIG. 3 is a diagram illustrating an overall processing flow in a user terminal.

FIG. 3 is a diagram illustrating an overall processing flow in the user terminal 1.

The distributed ledger management unit 15 (and the program control management unit 14) and the distributed ledger 16 illustrated in FIG. 3 indicate the distributed ledger management unit 15 (and the program control management unit 14) and the distributed ledger 16 of all the user terminals 1 in the distributed ledger system. That is, the distributed ledger management unit 15 (and the program control management unit 14) and the distributed ledger 16 illustrated in FIG. 3 may be the distributed ledger management unit 15 (and the program control management unit 14) and the distributed ledger 16 of the user terminal 1 illustrated in FIG. 1, or may be the distributed ledger management unit 15 (and the program control management unit 14) and the distributed ledger 16 of another user terminal 1. The processor 101 of the user terminal 1 reads and executes each program stored in the program memory 102, thereby implementing the operation of this flowchart.

Here, steps S101 to S104 indicate steps for preliminary preparation for using the identifier management program in the present embodiment, steps S105 to S107 indicate steps in normal use using the identifier management program, and steps S108 to S109 indicate steps in changing the identifier stored in the distributed ledger 16.

In the preliminary preparation, the transaction issuing unit 13 of the user terminal 1 issues an identifier registration transaction for registering the identifier management program in the distributed ledger 16 on the distributed ledger network 2 (step S101). In the identifier management program, a condition for confirming that the use transaction has been properly issued from the user terminal 1 at the time of normal use, an identifier change condition, and the like are set by the identifier management program setting unit 12.

The distributed ledger management unit 15 causes the program control management unit 14 to execute mining of the registration transaction (step S102). For example, in the case of using a blockchain, mining is performed on a block obtained by collecting a plurality of transactions including registration transactions received during a predetermined time interval.

The distributed ledger management unit 15 causes the program control management unit 14 to register the identifier management program in the distributed ledger 16 according to the identifier registration transaction that has succeeded in mining (step S103). When registering the identifier registration program in the distributed ledger 16, the distributed ledger management unit 15 acquires an ID indicating a storage location of the identifier registration program.

The user terminal 1 acquires the ID of the identifier management program from the distributed ledger management unit 15 (step S104). The user terminal 1 may also acquire an identifier calculated by the public key $P_{n-1}$ held by the identifier management program.

During normal use, the transaction issuing unit 13 of the user terminal 1 issues a use transaction including a request for using the information stored in the distributed ledger 16 (step S105). The use transaction includes, for example, an ID of an identifier management program, an available identifier, an instruction on a transaction of the cryptocurrency, and an electronic signature generated by the secret key $s_{n-1}$ managed by the transaction key management unit 10. The request for using the information stored in the distributed ledger 16 is not limited to the transaction of the cryptocurrency, and may be any request as long as the request is information stored in the distributed ledger 16 and the ownership can be transmitted and received between the user terminals 1.

The distributed ledger management unit 15 verifies the electronic signature included in the use transaction, and performs processing according to the request included in the use transaction after verification succeeds (step S106). That is, the distributed ledger management unit 15 passes the ID of the identifier management program included in the use transaction to the program control management unit 14, and the program control management unit 14 executes the identifier management program indicated by the ID. The program control management unit 14 verifies the use transaction by the identifier management program. For example, the program control management unit 14 performs signature verification using the public key $P_{n-1}$ held by the identifier management program for the signature value $\sigma_{n-1}$ of the electronic signature included in the use transaction. When the signature verification is successful, the program control management unit 14 determines that the verification is successful considering that the use transaction has been properly issued from the user terminal 1. That is, it is proved that the electronic signature is made by the user.

When the verification is successful, the distributed ledger management unit 15 causes the program control management unit 14 to perform processing of an arbitrary program according to the use identifier and the request included in the use transaction. When the program control management unit 14 determines that the use transaction has not been properly issued from the user terminal 1, the distributed ledger management unit 15 discards the use transaction. The distributed ledger management unit 15 may report the possibility of trial of unauthorized use to the user terminal 1.

The distributed ledger management unit 15 transmits processing execution result check information including the execution result to the user terminal 1 (step S107). Upon receiving the information, the user terminal 1 may display the execution result to the user via the output device 1072 of the user terminal 1.

In the identifier change, the user terminal 1 issues an identifier change transaction including an identifier change request on the distributed ledger network 2 (step S108). When the user terminal 1 leaks or loses the secret key $s_{n-1}$ due to negligence or the like, another terminal can acquire the leaked or lost secret key $s_{n-1}$. The other terminal that has acquired the leaked or lost secret key $s_{n-1}$ can issue a transaction using the secret key $s_{n-1}$ to impersonate the user terminal 1. Therefore, the user terminal 1 needs to change the identifier registered on the distributed ledger 16. In this case, the user terminal 1 acquires the secret key $s_n$ for the identifier change and the secret key $s_{n+1}$ used for the next identifier change condition setting, which are securely held separately from the user terminal 1, by reading the QR code printed on paper or the like by the identifier change key input unit 11. The user terminal 1 generates the public key $P_{n+1}$ used for the next identifier change from the acquired secret key $s_{n+1}$. The user terminal 1 discards the secret key $s_{n+1}$ from the inside of the user terminal 1 and securely stores the secret key $s_{n+1}$ again. Then, the user terminal 1 issues the identifier change transaction by the transaction issuing unit 13 by using the acquired secret key $s_n$.

FIG. 4 is a diagram illustrating a data structure of an identifier change transaction.

As illustrated in FIG. 4, the identifier change transaction includes three elements of an identifier management program ID, function information specifying a function to be executed by the identifier management program, and a public key $P_{n+1}$ to be used for the next identifier change. Here, the function information is assumed to be information specifying a function that causes the identifier management program to execute a functional capability of changing the identifier. The identifier change transaction includes a signature value an of the electronic signature on a hash value H(m) of a message m when the three elements are the message m, with the secret key $s_n$ used in an identifier change.

The distributed ledger management unit 15 confirms that the identifier change condition is satisfied and causes the program control management unit 14 to change the identifier (step S109). That is, when receiving the identifier change transaction, the distributed ledger management unit 15 reads the identifier management program ID included in the identifier change transaction and passes the identifier management program ID to the program control management unit 14. The program control management unit 14 reads and executes the identifier management program indicated by the ID, and checks whether the identifier change condition is satisfied.

That is, the program control management unit 14 determines whether the signature value $\sigma_n$ of the electronic signature included in the transaction is verifiable with using the public key $P_n$ used when the identifier is changed. As a result of the determination, when it is verifiable, that is satisfies the identifier change condition, the program control management unit 14 changes the next identifier change condition in the identifier management program, causes the identifier management program to hold the identifier change condition, and changes the public key used to calculate the currently available identifier from the public key $P_{n-1}$ to the public key $P_n$. When the identifier change condition is not satisfied, it is determined that the identifier change transaction is not properly issued from the user terminal 1, and the distributed ledger management unit 15 discards the identifier change transaction. The distributed ledger management unit 15 may report to the user terminal 1 that an unauthorized identifier change request has been made.

Figure 5:
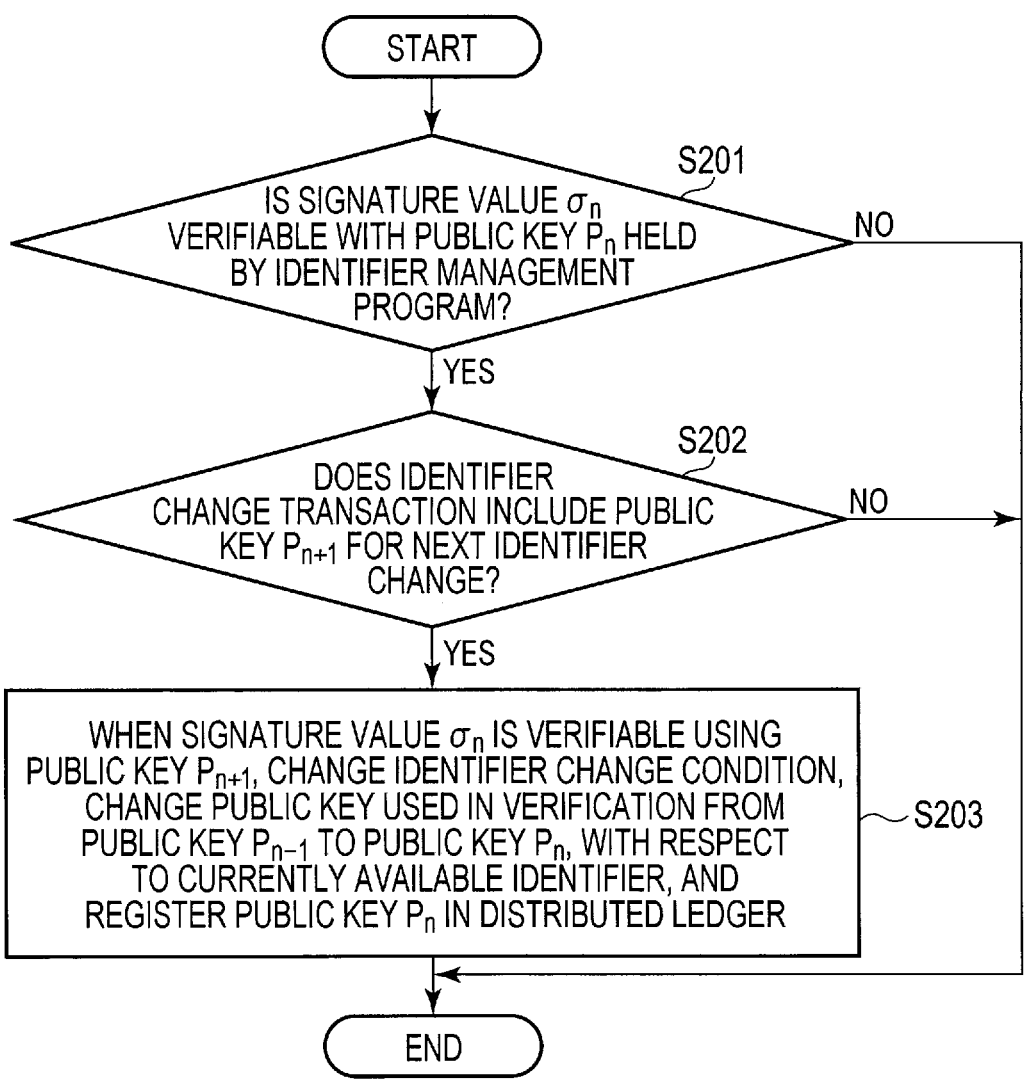
FIG. 5 is a flowchart for explaining step S109 illustrated in FIG. 3.

FIG. 5 is a flowchart for explaining step S109 illustrated in FIG. 3.

The program control management unit 14 determines whether the signature value on included in the identifier change transaction is verifiable with the public key $P_n$ held by the identifier management program (step S201). The identifier management program holds the public key $P_n$ used after an identifier change. Therefore, it is possible to verify the signature value $\sigma_n$ with the public key $P_n$. When the signature verification is successful, it is proved that the user terminal 1 that has issued the identifier change request has been properly issued the identifier change transaction, and it is proved that the user has the secret key $s_n$. It is also proved that the range of the message m is data created by the user having the secret key $s_n$. When the program control management unit 14 determines that two values do not match each other, the distributed ledger management unit 15 determines that the identifier change transaction has not properly issued from the user terminal 1, and discards the identifier change transaction.

When the signature value $\sigma_n$ is verifiable with the public key $P_n$, the program control management unit 14 determines whether the identifier change transaction includes the public key $P_{n+1}$ for the next identifier change (step S202). The message m needs to include the public key $P_{n+1}$ paired with the secret key $s_{n+1}$ used in the next identifier change. As a result, the public key $P_n$ for the identifier change is used only once for the identifier change. This means that $P_{n+1}$ different from the public key $P_n$ needs to be used for the next identifier change. This is to prevent a retransmission attack. The identifier change transaction is recorded in the distributed ledger 16. Therefore, the identifier change transaction is widely disclosed to other user terminals. If the public key for the identifier change is fixed without including the public key to be used next time or later in the identifier change transaction, a widely disclosed public key is stored, so that it is possible to perform a retransmission attack of retransmitting a change request having the same content. In order to eliminate this risk, it is necessary to use the public key for the identifier change only once and always specify the next public key. When the program control management unit 14 determines that the public key $P_{n+1}$ used in the next identifier change is not included in the identifier change transaction, the distributed ledger management unit 15 discards the identifier change transaction. In this case, the distributed ledger management unit 15 may transmit, to the user terminal 1, information notifying that the identifier change transaction has been discarded and that it is necessary to include the public key $P_{n+1}$ for the next identifier change in the identifier change transaction.

When the identifier change transaction includes the public key $P_{n+1}$, the program control management unit 14 changes the identifier change condition in the identifier management program, changes the public key in the normal use from the public key $P_{n-1}$ to the public key $P_n$, and causes the identifier management program to hold the public key $P_n$ (step S203). That is, the identifier calculated using the public key $P_n$ is registered in the distributed ledger 16 as the currently available identifier. Specifically, the identifier change condition is changed when it is determined that a signature value $\sigma_{n+1}$ of the electronic signature included in the transaction is verifiable using the public key $P_{n+1}$. The identifier management program holds the public key $P_{n+1}$ as data related to the next identifier change.

[Operation and Effect]

According to the above embodiment, the user terminal 1 can change the identifier without requiring a third party. As a result, the distribution of the authority, which is the largest feature of the distributed ledger 16, is not lost, and it is possible to prevent key leakage due to intention or negligence by a third party.

Other Embodiments

Note that the present invention is not limited to the above-described embodiment. For example, in the above embodiment, it has been described that the user terminal 1 functions as a node. However, when another user terminal functions as a node, the user terminal 1 may not function as a node. In this case, the user terminal 1 may not include the program control management unit 14, the distributed ledger management unit 15, and the distributed ledger 16.

Furthermore, the methods described in the above-described embodiments can be stored in a recording medium such as a magnetic disk (floppy (registered trademark) disk, hard disk, or the like), an optical disk (CD-ROM, DVD, MO, or the like), or a semiconductor memory (ROM, RAM, flash memory, or the like) as programs (software means) that can be executed by a computing machine (computer), or can also be distributed by being transmitted through a communication medium. Note that the programs stored on the medium side also include a setting program for configuring, in the computing machine, a software means (not only an execution program but also tables and data structures are included) to be executed by the computing machine. The computing machine that implements the present apparatus executes the above-described processing by reading the programs recorded in the recording medium, constructing the software means by the setting program as needed, and controlling the operation by the software means. Note that the recording medium described in the present specification is not limited to a recording medium for distribution, but includes a storage medium such as a magnetic disk or a semiconductor memory provided in the computing machine or in an apparatus connected via a network.

In short, the present invention is not limited to the above-described embodiments, and various modifications can be made in the implementation stage without departing from the gist thereof. In addition, the embodiments may be implemented in appropriate combination if possible, and in this case, combined effects can be obtained. Furthermore, the above-described embodiments include inventions at various stages, and various inventions can be extracted by appropriate combinations of a plurality of disclosed components.

REFERENCE SIGNS LIST

1 User terminal
2 Distributed ledger network
10 Transaction key management unit
11 Identifier change key input unit
12 Identifier management program setting unit
13 Transaction issuing unit
14 Program control management unit
15 Distributed ledger management unit
16 Distributed ledger
101 Processor
102 Program memory
103 Data memory
104 Communication interface
105 Input/output interface
106 Bus
107 User interface device
1071 Input device
1072 Output device

The invention claimed is:

1. An identifier change management apparatus connectable to a distributed ledger network, the identifier change management apparatus comprising:
a distributed ledger in which an identifier change program holding a public key used in an identifier change is registered;
circuitry configured to:
manage the distributed ledger;
receive a secret key used in the identifier change;
issue an identifier change transaction including a signature value of an electronic signature that has been performed using the secret key; and
change the identifier in response to receiving the identifier change transaction, by the identifier change program, on condition that the signature value included in the identifier change transaction is verifiable by using the public key.

2. The identifier change management apparatus according to claim 1, wherein the identifier change program includes a first public key that is the public key used in the identifier change, and a second public key used to calculate a currently available identifier, the secret key used in the identifier change is a first secret key paired with the first public key, and the circuitry is further configured to verify the signature value included in the identifier change transaction by using the first public key, and to change the second public key used to calculate the currently available identifier to the first public key when it is determined that the identifier change transaction has been properly issued as a result of the verification.

3. The identifier change management apparatus according to claim 2, wherein the circuitry is further configured to acquire a third secret key different from the first secret key and used for next identifier change, the identifier change transaction includes a third public key generated using the third secret key, and the circuitry is configured to set the third public key as the first public key used in a next identifier change when it is determined that the electronic signature has been properly issued.

4. The identifier change management apparatus according to claim 3, wherein the identifier change transaction further includes an ID of an identifier change program for identifying the identifier change program from the distributed ledger, and function information for specifying a function to be executed by an identifier management program, and the signature value is a signature value of an electronic signature that has been performed with the first secret key on a hash value of a message including an ID of the identifier change program, the function information, and the third public key.

5. The identifier change management apparatus according to claim 2, wherein the first public key is used only once to change the identifier, and is managed in a storage place different from the identifier change management apparatus.

6. An identifier change management method performed by an identifier change management apparatus connectable to a distributed ledger network, the identifier change management method comprising:

registering in a distributed ledger an identifier change program holding a public key used in an identifier change;

managing the distributed ledger;

receiving a secret key used in the identifier change;

issuing an identifier change transaction including a signature value of an electronic signature that has been performed using the secret key; and changing the identifier when receiving the identifier change transaction, by the identifier change program, on condition that the signature value included in the identifier change transaction is verifiable by using the public key.

7. A non-transitory computer readable storage medium storing a computer program which is executed by an identifier change management apparatus connectable to a distributed ledger network to provide the steps of:

registering in a distributed ledger an identifier change program holding a public key used in an identifier change;

managing the distributed ledger;

receiving a secret key used in the identifier change;

issuing an identifier change transaction including a signature value of an electronic signature that has been performed using the secret key; and changing the identifier when receiving the identifier change transaction, by the identifier change program, on condition that the signature value included in the identifier change transaction is verifiable by using the public key.

* * * * *